(12) United States Patent
Munk et al.

(10) Patent No.: US 10,316,849 B2
(45) Date of Patent: Jun. 11, 2019

(54) METHOD AND SYSTEM FOR DETECTION OF FAULTS IN PUMP ASSEMBLY VIA HANDHELD COMMUNICATION DEVICE

(71) Applicant: GRUNDFOS HOLDING A/S, Bjerringbro (DK)

(72) Inventors: Flemming Munk, Viborg (DK); Casper Lyngesen Mogensen, Viborg (DK); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 30 days.

(21) Appl. No.: 15/519,685

(22) PCT Filed: Oct. 15, 2014

(86) PCT No.: PCT/EP2014/072123
§ 371 (c)(1),
(2) Date: Apr. 17, 2017

(87) PCT Pub. No.: WO2015/197141
PCT Pub. Date: Dec. 30, 2015

(65) Prior Publication Data
US 2017/0248142 A1 Aug. 31, 2017

(51) Int. Cl.
*G06F 19/00* (2018.01)
*F04D 15/00* (2006.01)
*F04D 13/06* (2006.01)
*F04D 29/046* (2006.01)
*F04D 29/66* (2006.01)
(Continued)

(52) U.S. Cl.
CPC ......... *F04D 15/0088* (2013.01); *F04D 13/06* (2013.01); *F04D 15/0077* (2013.01); *F04D 29/043* (2013.01); *F04D 29/046* (2013.01); *F04D 29/669* (2013.01); *G01H 17/00* (2013.01); *G01M 99/008* (2013.01)

(58) Field of Classification Search
CPC ...... B04B 13/00; B04B 5/0414; B04B 5/0421
USPC .................................. 702/39, 182–185, 188
See application file for complete search history.

(56) References Cited

U.S. PATENT DOCUMENTS 8,840,838 B2 * 9/2014 Holmes ................. B04B 5/0414
422/415
2006/0266913 A1 11/2006 McCoy et al.
(Continued)

FOREIGN PATENT DOCUMENTS

EP 1 972 793 A1 9/2008
JP 2 847643 B2 1/1999
(Continued)

*Primary Examiner* — Edward Raymond
(74) *Attorney, Agent, or Firm* — McGlew and Tuttle, P.C.

(57) ABSTRACT

A method for detecting faults or operational parameters in a pump assembly by use of a handheld communication device is described. The pump assembly includes an electric motor and a pump, wherein the pump assembly or electric motor has at least one rotating shaft The method comprises the steps of: a) contactless measuring a sound signal emanating from the pump assembly by use of a microphone connected to or implemented in the handheld communication device, b) processing the measured sound signal, and c) recognising one or more sound emanating condition including any possible faults by way of the processed sound signal.

32 Claims, 8 Drawing Sheets

(51) Int. Cl.
*G01H 17/00* (2006.01)
*F04D 29/043* (2006.01)
*G01M 99/00* (2011.01)

(56) References Cited

U.S. PATENT DOCUMENTS

2008/0234964 A1   9/2008   Miyasaka et al.
2010/0092307 A1   4/2010   Malakhova et al.
2012/0111114 A1   5/2012   Emde et al.
2014/0167810 A1   6/2014   Neti et al.

FOREIGN PATENT DOCUMENTS

JP    3 046426 B2    5/2000
WO    2010/092238 A1    8/2010
WO    2013/171245 A1    11/2013

* cited by examiner

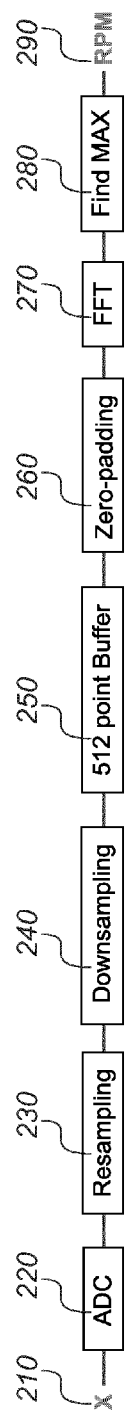
Fig. 6
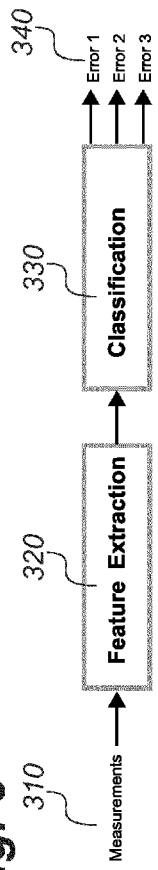
Fig. 7
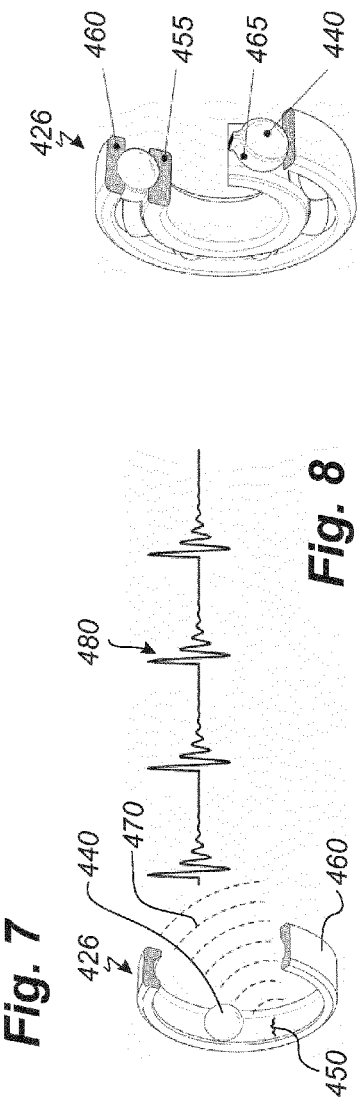
Fig. 8
Fig. 9
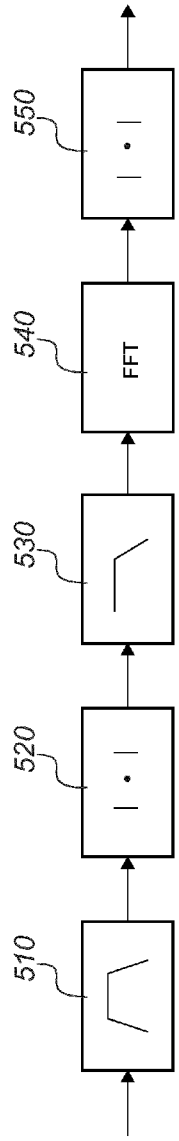
Fig. 10

METHOD AND SYSTEM FOR DETECTION OF FAULTS IN PUMP ASSEMBLY VIA HANDHELD COMMUNICATION DEVICE

FIELD OF THE INVENTION

The present invention relates to a method for detecting faults or operational parameters in a pump assembly having an electric motor and a pump. The invention further relates to a fault detection system for detecting faults in a pump assembly comprising a pump and an electric motor, wherein the pump assembly or electric motor has at least one rotating shaft.

BACKGROUND OF THE INVENTION

Different fault conditions may occur in pump assemblies, which are driven by electrical motors. The faults may occur to the electrical motor itself, or it may occur to parts of the pump. The faults may for instance be bearing faults, damage to the impellers or contamination of the pump assembly. Further, some faults, such as cavitation, occur only at certain drive conditions of the pump assembly.

It is desirable to be able to detect such faults as early as possible in order to be able to replace the damaged parts or the entire pump assembly before a complete failure of the pump assembly occurs.

EP 1 972 793 A1 (Grundfos) described a method for detection of errors in a pump assembly via a vibration sensor, such as an accelerometer, which is fitted to the pump assembly. However, this method has the disadvantage that the sensor needs to be fitted to the housing of the pump, which in many situations is cumbersome.

Further, there is a need for a method and system, whereby a service worker or user more easily can identify faults in a pump assembly without the need to carry bulky equipment when servicing the pump assembly

SUMMARY OF THE INVENTION

It is an object of the invention to obtain a new method and system, which overcome or ameliorates at least one of the disadvantages of the prior art or which provide a useful alternative.

According to the invention, this is obtained by a method for detecting faults in a pump assembly including an electric motor and a pump by use of a handheld communication device, wherein the pump assembly or electric motor has at least one rotating shaft, the method comprising:
a) contactless measuring a sound signal emanating from the pump assembly by use of a microphone connected to or implemented in the handheld communication device,
b) processing the measured sound signal, and
c) recognising one or more sound emanating condition including any possible faults by way of the processed sound signal.

This provides a particular simple method, where a handheld communication device, such as a smart phone, can be used for detecting a sound signal by use of an internal or external microphone. Further, by processing the sound signal, it is made possible to detect faults via a non-invasive, contactless method, since no sensors have to be fitted to the pump assembly.

The processing unit or software may be implemented in for instance an app that is installed on the smart phone. Alternatively or in addition thereto, the processing unit or software (or part thereof) may be implemented on an external server unit. Thus, the measured sound signal or partially processed signal may be uploaded to a server or a cloud, where the detected sound signal is processed.

Overall, the method provides a method where a worker or user having to service the pump assembly will be able to detect faults by use of the handheld communication device and optionally an externally coupled microphone only, which provides a particular simple fault detection system and method compared to prior art systems and methods. Further, the method has advantages over fault detection methods utilising accelerometers or vibrometers, since these are sensitive to the position on the pump assembly.

An app is installed on the handheld communication device for detecting and recognising the condition or fault of the pump. The app acts as a front-end for the processing and analysing unit, or the processing and analysing part may be implemented in the app.

The term "handheld communication device" may cover a number of portable devices of a limited size and may for instance be chosen from the group consisting of: a smart phone, a tablet, a PDA, and a wearable device, such as a smart watch.

The terms "app" or "software app" are abbreviation for application and software application. An app is a piece of software and may run on the Internet, on a computer, a smart device or other electronic devices. In the present invention, the app is run on the handheld communication device.

According to an advantageous embodiment, the processing step of step b) comprises the sub-steps of processing the measured sound signal so as to estimate the rotational speed of the rotating shaft and optionally normalising the measured sound signals or processed sound signals. Thereby, the influence of the rotational speed of the shaft may be eliminated from the signal or processed signal, whereby the processed signal is independent of the rotational speed of the shaft. Thereby, sound emanating conditions including any possible faults may be detected independent of the current rotational speed.

The estimation of the rotational speed may be carried out via a spectral analysis. This may for instance be carried out by sampling and optionally down-sampling the measured sound signal after which the sampled signal is run through a Fast Fourier Transformation (FFT), and wherein the FFT signal is analysed in order to locate peaks. The peaks will correspond to the rotational speed of the shaft.

In yet another advantageous embodiment, the processing step of step b) comprises the step of filtering out periodic signals of the processed signal, wherein the recognition of step c) is carried out by use of the periodic signals.

In a particular advantageous embodiment, the method comprises the step of running a pre-routine, where the rotating shaft is brought to a drive condition, where sound signals emanating from the pump assembly are detectable by the microphone. Small circular pumps in homes run very silent and can be difficult for a standard handheld communication device to detect. In general, this may be carried out in a number of ways. It may for instance be carried out by letting the drive shaft be swept from a low rotational speed (or from zero) and increase the rotational speed until a sound signal can be detected. In some situations, the operational test condition may be driven at a higher rotational speed than the normal operating conditions in order to ensure that a sound signal can be measured and to ensure that the sound emanating from the pump assembly is within an audible range, e.g. above 20 Hz.

In another embodiment, an external microphone is coupled to the handheld communication device. Thereby, it is possible to use for instance a high-sensitive microphone, which may be sufficient for measurements on small circular pumps in homes.

In one embodiment, steps b) and/or c) are carried out via a processing unit, such as a DSP or micro-processor, implemented in the handheld communication device and/or a software application installed on the handheld communication device. In another embodiment, steps b) and/or c) are carried out via a processing unit implemented in an external server or a software program installed on an external server. It is also possible to carry out steps b) and c) partly by the handheld communication device and partly by the external server.

The app may also store the measurements on the handheld communication device and then upload the measurements later to an external server for processing and analysis. It is also contemplated that the measured sound may be continuously streamed to the external server.

According to an advantageous embodiment, the processing unit or software app comprises a library or database of different pump assembly types or models.

In one embodiment, the sound emanating condition including any possible faults in step c) is recognised by use of said library of different pump assembly types or models. Thus, the library makes it possible to link certain processed sound spectrums to particular fault types of a particular pump assembly type or model. Thereby, a more accurate fault detection method may be obtained.

The pump assembly type or model may advantageously be input into the handheld communication device. This may simply be carried out by typing or finding the pump assembly type or model into the app, or by choosing a picture from the app corresponding to the particular pump assembly type or model. Thereby, the installed app may be instructed in linking the processed sound spectrum to the particular pump assembly type or model. Alternatively, the user can take a photograph of the nameplate on the pump assembly, and detection software in the handheld communication device may then identify the type or model. It is also possible to utilise QR codes or similar.

In one embodiment, the app on the handheld communication device prompts an external server for information about the inputted pump assembly type or model. This may for instance be initiated, if the inputted pump assembly type or model is not present in the library installed on the handheld communication device. In this case, the app may prompt the external server for information about the new pump assembly type or model and download this information to the smart phone or other type handheld communication device. It may also be initiated as a general step, if the processing and analysing is carried out in the external server.

The library may further comprise information about how to rectify an identified fault for a particular pump assembly type or model. Thus, the library may for instance comprise a guide advising the service worker on the different steps to be carried out in order to rectify the fault. The guide may be installed in the app on the handheld communication device, or the guide may be uploaded or accessed from an external server, once the pump assembly type or model and fault have been detected.

Additionally, the library may further comprise information about how to align the microphone in relation to the pump assembly. Thereby, the service worker may be instructed in how to best obtain and measure the sound signals needed for identifying a particular condition or fault of the pump assembly.

In one advantageous embodiment, the library is further adapted to accumulate sound measurements or processed sound measurements from different pump assemblies. Thereby, it is possible to provide a library of known sound measurements or processed spectrums, whereby the system may better learn to identify different types of faults and optionally dependent on the particular pump assembly type or model. The learning process can for instance be carried out via the use of a neural network. The sound measurements may for instance be linked to a certain types of identified faults, which may also encompass fault types, which have not previously been encountered. This can also facilitate the learning process.

In one embodiment, step a) comprises a plurality of measurements with the microphone arranged at different locations relative to the pump assembly. Alternatively or in addition thereto, steps a) and b), or steps a), b), and c) may be repeated with the microphone arranged at different locations relative to the pump assembly. Different types of operating conditions may more easily be measured at different microphone positions. Sound emitted due to the rotational speed of the shaft may for instance for certain types of pumps more easily be measured at an end portion of the pump, whereas faults, such as a damaged bearing, may better be measured from a side portion or cylindrical portion of the pump.

According to an advantageous embodiment, the handheld communication device provides a feedback, e.g. an audial, visual or vibrational feedback, when an acceptable measurement position of the microphone has been found. The acceptable condition may for instance be determined by a minimum threshold value for the measured sound signals.

The processing in step b) may preferably be carried out via a method chosen from the group of: RMS level detection, spectral analysis, envelope analysis, and Cepstral analysis. The processing may also be carried out by a combination of said analysis methods, whereby the significance of the analysis may be increased.

In a particular advantageous embodiment, the at least one rotating shaft is swept from a first rotational speed to a second rotational speed over a pre-set time period, and wherein the method a spectrogram is measured and processed. Thus, the processed signal is analysed in order to compare operational conditions in a diagram plotted with two variables, e.g. the rotational speed and the sound frequency. This provides a method with even higher significance as the conditions are analysed over a greater range than just one rotational speed. The spectral contributions that increase proportional with the shaft frequency are related to the bearing and will thus give a clear indication of bearing faults. Further, some parts of the spectrum are independent of the shaft frequency and will thus give an indication across the spectrum and may be related to the resonance structure of the motor.

Instead of sweeping through a number of rotational speeds, it is also possible to make contactless measurements at discrete operational points. Thus, contactless measurements are performed at a first operation point. The pump assembly is then moved in its operational state to a second discrete point, e.g. by increasing the rotational speed of the shaft, and measurements are then performed in this working point. The measurements of the two operational points are then compared by the handheld communication device, and the optimum operational point is then selected by the app in the device. An instruction is then given by the device to the pump assembly that the pump assembly must run in the optimum operational point from now on. With the method, just described, diagnostics are performed in two or more separate points of operation, and the pump assembly is transferred from a sub-optimum working point with e.g. unacceptable resonance frequencies in the assembly, or cavitation in the pipes or in the pump, to an operation point with less resonance frequencies or no cavitation. Movement from one working point to another can be based on a measurement of a single parameter in each of the two working points, e.g. measuring flow noise in the pipes, or can be based on measurement of a plurality of parameters. Accordingly, the measurements may be carried out at a plurality of different discrete rotational speeds of the at least one rotating shaft e.g. to find optimum measurement conditions.

In a highly advantageous embodiment, fault states are logged during the sweep in order to identify rotational speed regions, where the pump assembly is faulty. This may for instance be regions, where the fault states are particular pronounced, e.g. where resonance effects enhance the faults. It may for instance be cavitation states, which occur for particular shaft speeds. The fault states may for instance be logged if a measured significance level is about a set threshold level.

According to another advantageous embodiment, the pump assembly is subsequently instructed to avoid driving the pump assembly at rotational speed regions, where the pump assembly is faulty or the states, where faults are particularly pronounced. Thereby, the lifetime of the pump assembly may be extended by ensuring that the pump assembly is not driven at rotational speeds, where the pump assembly may be further damaged. This is particular relevant for cavitation, which may occur only at particular drive conditions.

The instructions may be sent wirelessly from the handheld communication device, e.g. by Bluetooth or infrared. Alternatively, the pump assembly may receive the instructions via an external server.

The fault states may for instance be identified among the group of: bearing faults, cavitation, dry running, water hammering and unbalance.

The invention also provides a fault detection system for detecting faults or operational parameters in a pump assembly comprising a pump and an electric motor, wherein the pump assembly or electric motor has at least one rotating shaft, and wherein the fault detection system further comprises:
   a handheld communication device, which includes
      a microphone for contactless measuring sound emanating from the pump assembly or electric motor, and further
      a processing unit implemented in the handheld communication device and/or a software app installed on the handheld communication device for processing a measured sound signal measured via said microphone, wherein the fault detection system further comprises:
   a recognition module for recognising a sound emanating condition including any possible faults by way of the processed sound signal.

This provides a particular simple system, where a service worker only needs to bring a handheld communication device, such as a smart phone, and possibly an externally connected microphone for identifying faults in a pump assembly. The system allows sound signals to be measured by use of an internal or external microphone. Further, by processing the sound signal, it is made possible to detect faults via a non-invasive, contactless method, since no sensors have to be fitted to the pump assembly, which otherwise could influence the measurements.

In one embodiment, the microphone is implemented in the handheld communication device. In another embodiment, the handheld communication device may for instance be a smart phone, and the microphone is the internal microphone of the smart phone. In yet another embodiment, the microphone is externally coupled to the handheld communication device.

The recognition module may advantageously be implemented on the handheld communication device.

According to a particular advantageous embodiment, the system further comprises an external server. In such a setup, the recognition module may be implemented on the external server. Further, part of the processing unit may also be implemented on the external server, e.g. as a signal processor or a software application.

The system may further comprise a filter module adapted for processing the detected sound signal so as to eliminate an influence of a current rotational speed of the shaft and filtering out periodic signals of the processed signal. This filter module may be implemented in the handheld communication device or the external server.

The processing unit and/or filter module may comprise an analysis module chosen from the group of: an RMS level detection module, a spectral analysis module, an envelope analysis module, and a Cepstral analysis module.

The recognition module may advantageously comprise fuzzy logic and/or a neural network.

In one advantageous embodiment, the system comprises a library module, in which characteristic patterns are stored for certain operating conditions, and wherein the recognizing module is designed for recognition of an operating condition by way of the stored pattern. The patterns may be based on any of the previous analysis methods and modules, i.e. RMS level patterns, spectral patterns, envelope patterns, or Cepstral patterns.

The microphone may be a directional microphone, e.g. having a directional profile, where the microphone is particular sensitive to certain directions and possibly suppressing sound from certain directions.

The recognition module may advantageously also be adapted to estimate the rotational speed of the at least on rotating shaft. Thereby, the system is able to normalize the measured sound spectrum to the rotational speed of the shaft, whereby the spectrum can be compared across broad drive conditions.

It is recognized that some of the embodiments are more generic in nature. Thus, most of the embodiments may also be carried out by use of other types of sensors. Accordingly, the embodiments relating to the various algorithms and use of an external sensor may also be carried out via for instance a handheld communication device and a secondary sensor, such as an accelerometer. This may further be used as verification of measurements based on sound.

BRIEF DESCRIPTION OF THE FIGURES

The invention is explained in detail below with reference to embodiments shown in the drawings, in which FIG. 6 illustrates steps involved in estimating the rotational speed of a shaft in a pump assembly by use of measured sound signals, FIG. 7 illustrates the steps in a condition monitoring system, FIG. 8 illustrates a fault in a bearing of a pump assembly and the associated sounds emitted due said fault, FIG. 9 shows a bearing in perspective, FIG. 10 illustrates the steps in an envelope analysis method.

DETAILED DESCRIPTION OF THE INVENTION

Figure 1:
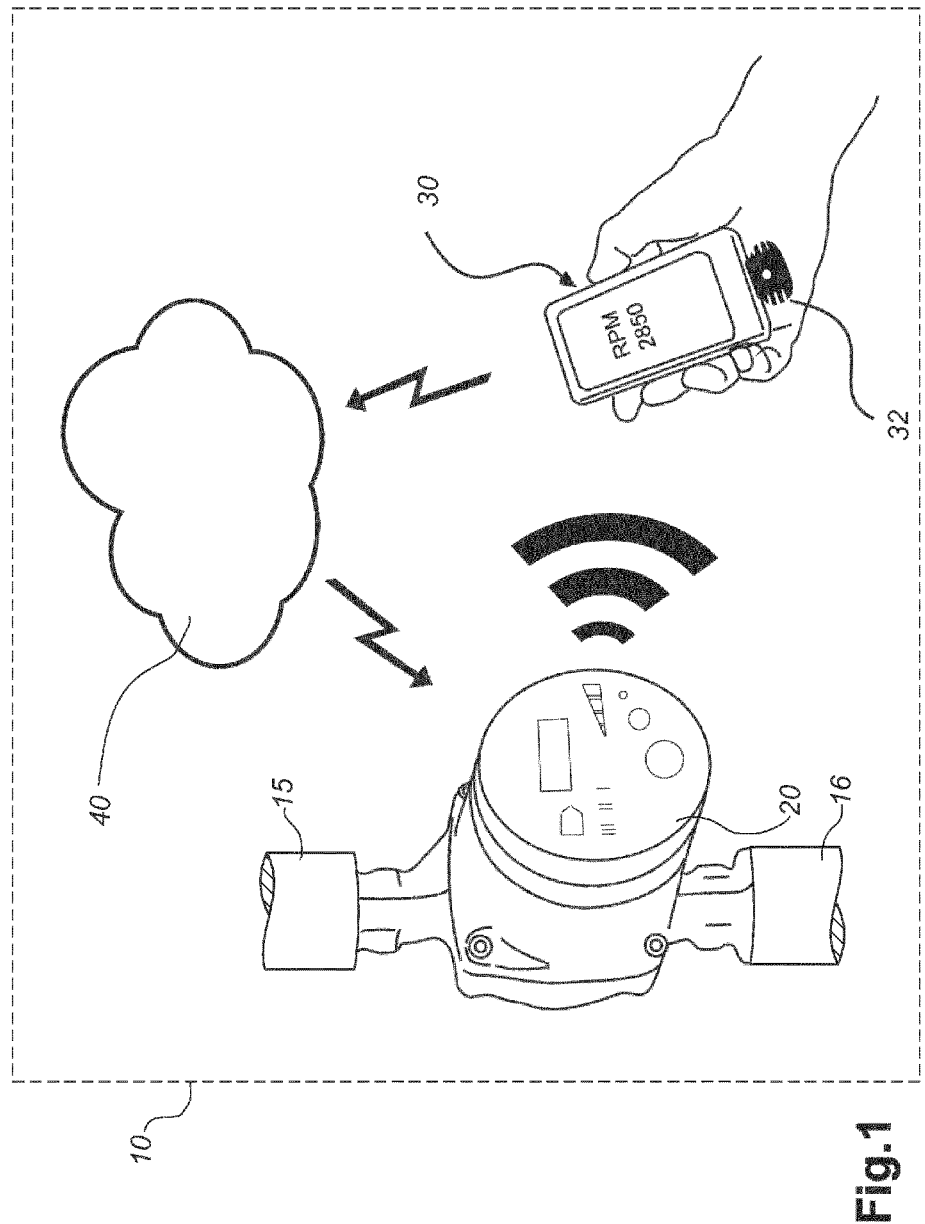
FIG. 1 shows an embodiment of a fault detection system according to the invention.

FIG. 1 shows a fault detection system 10 according to the invention for detecting faults in a pump assembly 20, which comprises a pump and an electrical motor (not shown). The pump assembly 20 is installed in a pipe system with pipes 15, 16. The system comprises a handheld communication device 30, e.g. in form of a smart phone as illustrated or a tablet computer or the like. The handheld communication device 30 comprises an externally coupled microphone 32, which may be used for contactless measuring sound signals emanating from the pump assembly 20. The system further comprises an external server 40 or cloud. The pump assembly 20 is a circular pump typically used for circulating water in heating systems.

Figure 2:
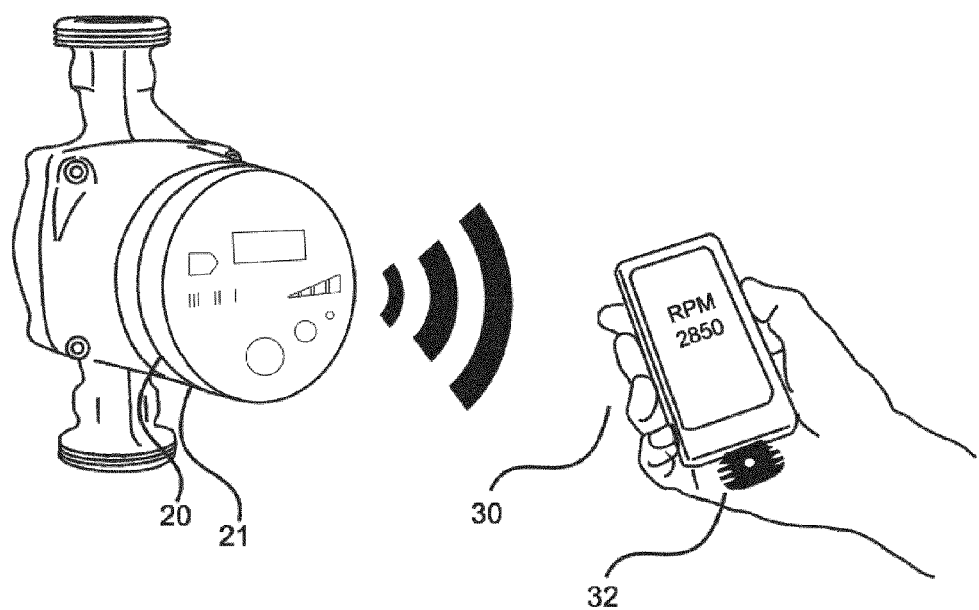
FIG. 2 shows an embodiment of the fault detection system with a first type of pump assembly.

In a first embodiment, the pump assembly 20 is of a type as shown in FIG. 2, where the pump and electrical motor are implemented into a common housing 21. In a second embodiment shown in FIG. 3, the pump assembly 20' is of a type, wherein the pump and the electrical motor are separated into a pump housing 22' and an electrical motor housing 24' respectively.

Thus, in difference to the pump assembly of FIGS. 1 and 2, the pump assembly 20' has distinct and separated sources of acoustical noise. Noises from ball bearings, stator, rotor and other parts will come from housing 24', and electrical noise will emanate from the terminal box 25', which incorporates control electronics for the pump assembly. Noise from the fluid in the pipes, i.e. flow noise, emanates from the pump housing 22' or from the pipes (not shown) connected to the pump housing. Noise from cavitation, from the impeller of the pump or from water hammer will also emanate from this area of the pump assembly.

The handheld communication device 30 may comprises a processing unit, such as a microcomputer or a digital sound processor and/or a software application installed on the handheld communication device 30 for processing a sound signal measured via the microphone 32. The measured sound signals or the processed sound signals may be compared to known sound emanating conditions, which are indicative of a fault in the pump assembly by use of a recognition module.

Figure 3:
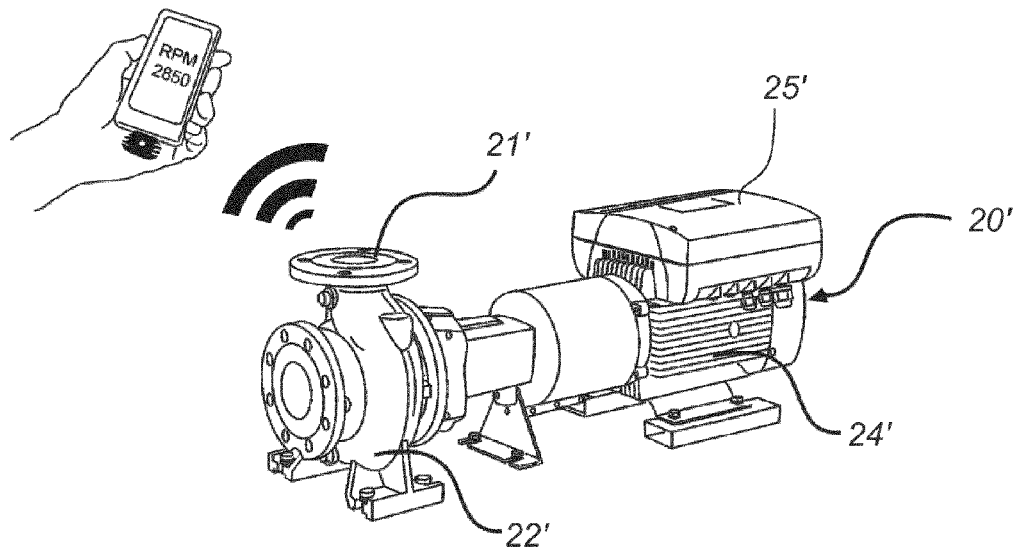
FIG. 3 shows an embodiment of the fault detection system with a second type of pump assembly.

In FIGS. 1-3, the microphone 32 has been depicted as an externally coupled microphone. However, the invention also contemplates using an internal microphone. The external microphone may for instance be necessary, if the internal microphone of the handheld communication device 30 has particular restrictions on the measurable audio bandwidth or directional restraints.

Figure 4:
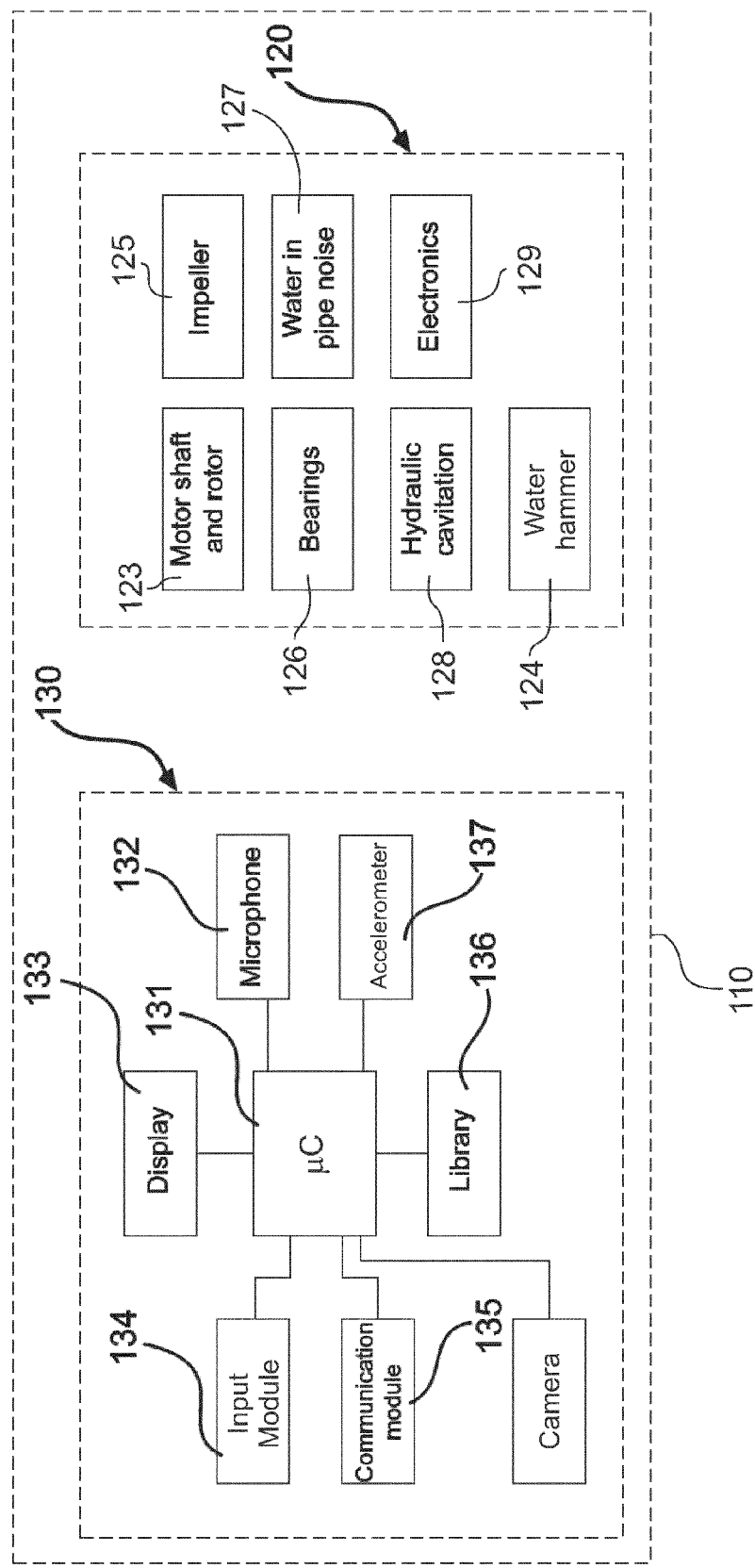
FIG. 4 illustrates components of a handheld communication device part of the fault detection system, and components and sound sources of a pump assembly.

FIG. 4 shows one embodiment of a handheld device 130 and a pump assembly 120 for use in the fault detection system 110 according to the invention.

The handheld communication device 130 comprises a microcomputer 131 for assisting and interpreting data. The fault detection system may comprise a dedicated system, e.g. a microcomputer or digital signal processor particularly designed for detecting fault conditions, but in a preferred embodiment, the fault detection system comprises a dedicated software application, which is installed on the handheld communication device 130.

As previously mentioned, the handheld communication device 130 comprises a microphone 132 for contactless measuring sounds (illustrated with waves between the handheld communication device and pump assembly) emanating from the pump assembly 120 and which may be indicative of a particular fault condition of the pump assembly 120. The handheld communication device 130 further comprises a display 133 for providing a visual feedback to a service worker using the handheld communication device 130. The handheld communication device 130 additionally comprises an input module 134, whereby the service worker may input information into the handheld communication device 130 or the software application installed on the communication device 130. The input module 134 may be part of the display via for instance a touch display, which is now part of most smart phones and tablet computers. However, in principle the input module may also be a keypad of the communication device 130.

The handheld communication device 130 further comprises a communication module 135 which allows the handheld communication device 135 to communicate with the pump assembly 120 and/or the external server. The communication device may comprise a number of different communication types, such as but not limited to GSM, CDMA, 3G, 4G, infrared, and Bluetooth®.

The handheld communication device 130 may further comprise a library 136 stored in the software application. The library may comprise a database over known pump assembly types and models, known faults and related sound emanating conditions, e.g. linked to the particular pump assembly type or model, instruction guides on how to obtain measurements from the particular pump assembly type or model, and instruction guides on how to rectify an identified fault.

In addition to the microphone 132, the handheld communication device 130 may further comprise a number of other sensors, such as for instance an accelerometer 137. The sensors are advantageously integrated in the handheld communication device 130, however; as with the microphone, it is also possible to use externally coupled sensors. The additional sensors may for instance be used to obtain a secondary verification of the sound measurement. The internal accelerometer 137 may for instance be used for a secondary measurement, where the handheld communication device 130 physically contacts the housing of the pump assembly 120 so as to obtain vibration measurements.

As further shown in FIG. 4, the pump assembly 120 comprises a number of different features, which may lead to faults and noise sources. The pump assembly 120 comprises a motor and rotor 123 for driving the pump, and which may be the source of emitted sounds and faults. Further, the pump assembly 120 may comprise bearings 126, which along with mechanical seals, are often the source of occurring faults in pump assemblies. The pump may further comprise an impeller 125 with impeller blades or vanes that cause the movement of fluid in the pump. The pump assembly 120 further comprises electronic parts 129 for controlling the pump assembly 120 and acting as an interface between a service worker or external server and the pump assembly 120.

Further, noise from water in the pipe 127 may be the source of sounds emitted from or near the pump assembly and may vary from turbulent or laminar flows. Further, the pump assembly 120 may be prone to cavitation 128 at certain drive conditions. Cavitation is the formation of vapour cavities in a liquid, such as small air bubbles or voids in water, which are caused by forcing acting upon the liquid. Cavitation usually occurs when a fluid is subjected to rapid pressure change that cause the formation of cavities, when the pressure is relatively low. When subjected to a relative high pressure, the voids implode and can generate intense shockwaves, which may cause wear to for instance the impeller 125 of the pump assembly 120. Noise from cavitation typically appears as small "pops" e.g. in the kHz-band, e.g. 10 kHz-20 kHz. Additionally, water hammering 124 may occur.

Each noise source has its specific frequency range. Noise from the impeller in the pump typically is the same as the rotational speed of the shaft, i.e. around 3000 RPM. In addition to this, the blades on the impeller also generate noise, the blade frequency being a multiple of the rotational speed. Flow noise, i.e. noise stemming from the liquid flowing in the pipes, is typically white noise, also called 1/f noise, and is in the range of 1 Hz to 25 kHz. The electronics of the pump assembly often generates a broadband noise spectrum due to the use of switching electronics. A typical range is 50 kHz to 200 kHz. Cavitation noise is as mentioned in the range of 10 kHz to 20 kHz. Ball bearings generated noise in the area of 1 kHz to 15 kHz, while the electrical motor and the mechanical rotor creates noise in the range of the rotational speed of the shaft. Water hammer, which in extreme cases can destroy the pump, is detectable in the range of 1 Hz to 300 Hz.

Overall, the system provides a particularly simple fault detection system 10, 110, where a service worker only needs to bring a handheld communication device 30, 130, such as a smart phone, and possibly an externally connected microphone for identifying faults in a pump assembly 20, 120. The system allows sound signals to be measured by use of an internal or external microphone. Further, by processing the sound signal, it is made possible to detect faults and/or identify fault causes via a non-invasive, contactless method, since no sensors have to be fitted to the pump assembly, which otherwise could influence the measurements, and which are sensitive to the position on the pump assembly.

The analysis tool may be implemented in a processing unit or software application that is installed on the handheld communication device. Alternatively or in addition thereto, the processing unit or software (or part thereof) may be implemented on an external server unit. Thus, the measured sound signal or partially processed signal may be uploaded to a server or a cloud, where the detected sound signal is processed.

The system may be configured to identify a number of different fault states, e.g. identified among the group of: bearing faults, cavitation, dry running, water hammering and unbalance.

Figure 5:
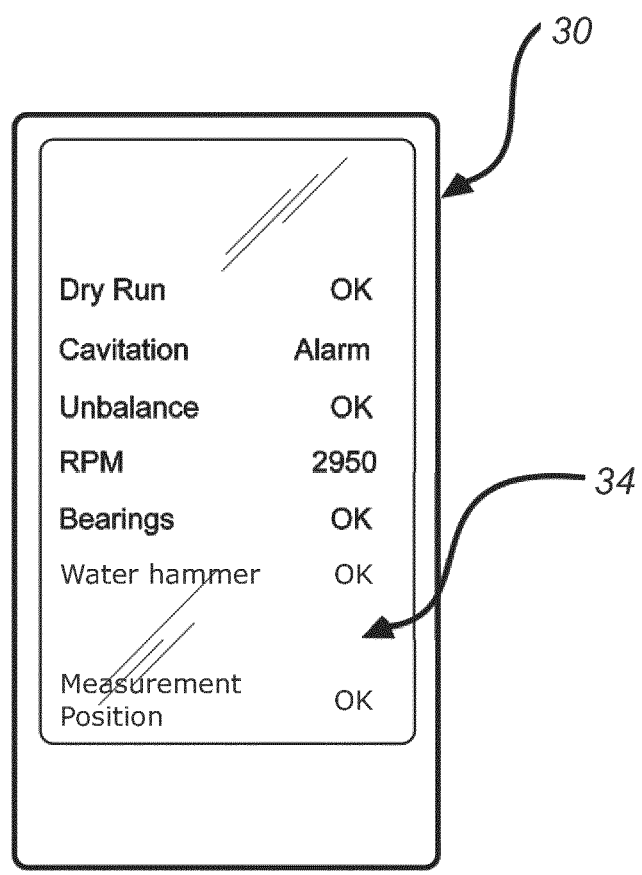
FIG. 5 shows a handheld communication device with a Graphical User Interface.

The software application installed on e.g. a mobile phone 30 having a display 34 may be provided with a Graphical User Interface (GUI) as for instance shown in FIG. 5, which may show the status of the afore-mentioned fault states. Further, the system may be adapted to detect the rotational speed of the shaft of the pump assembly and may display this on the GUI as well. Further, the GUI may show the measured sound frequency spectrum. The measured sound signals may be normalised in accordance with the detected rotational speed, whereby it is made easier to compare the fault spectrum to know sound emanating conditions.

Estimating the Rotation Speed Based on Spectral Analysis

When working with a pump assembly as in the present invention, it is often important to know the physical rotation speed of the shaft or RPM. Knowing the electrical frequency of the electrical motor is not enough, as there exist a slip between the electrical and the physical speed for asynchronous motors.

The physical speed of the shaft can be measured by using a tachometer. The principle is to beam a laser to a reflecting tape on the shaft, and thereby counting the number of reflections during a time interval. However, this will require that a reflecting tape to be mounted on every shaft, and often it will not be practical or even possible to get into contact with a rotating shaft. This is also not aligned with the principle behind the present invention, which is intended to provide a simple tool for the service worker and preferably a non-invasive and contactless method of detecting the rotational speed and a possible fault.

Accordingly, the fault detection system comprises an algorithm for estimating the rotational speed of the shaft based on sound signals measured with the system according to the invention. The outline of the algorithm is illustrated in FIG. 6.

The sound signal is measured (in step 210) via the microphone of the handheld communication device and is converted to a digital sample signal (in step 220), which provides an array of samples having a number of samples produced at a given sampling frequency, which is set by the handheld communication device. In order to process the sampled signal, it may be necessary to resample (in step 230) the vector sample to a power of two.

The frequency band that will contain a signal component related to the RPM will typically be in the range of 10 to 60 Hz. To restrict the frequency analysis to this band, the signal is down-sampled to for instance 128 Hz (in step 240) and keeping the frequency above the Nyquist rate. For some handheld communication devices, it is only possible to detect audible frequencies above 20 Hz. In such a case, it may be necessary to increase the RPM to a speed, where it can be detected.

In each loop of the program, the down-sampling provides a limited number of samples. To obtain a sufficient frequency resolution, the samples are collected into a circular buffer with a size of for instance 512 samples (in step 250).

If a frequency analysis is performed on the buffer vector, the corresponding RPM resolution will be $\Delta$RPM=60 (128 Hz/512 points)=15 rpm. This resolution may in some circumstances be too low. To increase the resolution, the length of the signal vector must be increased. However, increasing the signal vector will slow down the estimator. Another solution will be to keep the frequency resolution, but interpolate the number of points in the spectra using zero padding (step 260). The new signal vector will contain a windowed version of the buffer vector—zero padded to for instance 8192 points—which provides a resolution of approximately 1 rpm.

The interpolated signal is Fourier transformed (in step 270) and the resulting Fourier spectrum will show a clear peak corresponding to the RPM. Thus, the RPM may (in step 290) be found by finding a maximum or peak of the Fourier spectrum (in step 280).

The vibration or sound spectrum from a running motor will always produce a small signal component corresponding to the rotation frequency because no rotor can be made without a small imbalance. However, other signal components can be generated from other parts of the motor, pump or fluid. To make the estimation of the RPM more robust, a small search window may be introduced. The position of the search window will be controlled from known motor parameters, or if the operator has some knowledge about the expected RPM. The size of the window may for instance be fixed to a width of 200 rpm and the height of the window is set to 1.

It should be noted that the algorithm for detecting the RPM is generic in nature and not only restricted to sound measurements via a handheld communication device. The estimation may for instance also be based on vibration measurements as for instance described in EP1972793.

Accordingly, the invention also provides a method of estimating the rotational speed of a shaft of a pump assembly, where a vibration or sound is measured and sampled, resampled, down-sampled, buffered, zero-padded, Fourier transformed, and peak detected.

Fault Detection

In the following, the fault detection system and method of identifying faults are explained with reference to bearing fault detection. However, the system is also applicable for detecting other types of faults.

The concept of Condition Monitoring (CM) is the use of advanced technologies in order to determine equipment conditions, and potentially predict failures. A perspective of this early prediction is to change load conditions in order to delay a potential break down until a scheduled maintenance. This will in general improve equipment reliability, minimizing downtime and maximizing component life.

In the current application, the objectives is to develop a CM system to detect bearing faults based on measured sound signals 310 via a handheld communication device. A typical detector for a CM system could be constructed by the two elements shown in FIG. 7, viz. a feature extraction 320 and a classification 330 of the fault.

Feature extraction is the process of generating a set of descriptors or characteristic attributes from the sound measurements. The Classification is the process of interpreting and comparing the feature against a set of pre-analyzed features with known causes, in order to estimate a proper diagnosis. This division is advantageous, as it underline the fact, that the best classification algorithm based on a large neural network will make a wrong diagnosis, if the feature extraction algorithm is poorly made.

A bearing 426 as shown in FIGS. 8 and 9 is a high precision mechanical construction with two raceways and a finite number of balls 440. As the inner 455 and outer raceway 460 are rotating with a relative speed, the corresponding emitted sound signal obtained with a microphone will be a low power white noise-like signal. However, in the case of any abnormality, such as a crack 450 in the outer raceway 460, a transient response will be measured by the microphone every time a ball 440 hits this defect 450. This will make the corresponding sound signal 470 significant with a periodic structure 480 reflecting the time interval between each impact.

The signal analysis of sound signal data has currently resulted in four different approaches to determine the level of damages, viz. RMS level detection, spectral analysis, envelope analysis, and Cepstral analysis.

RMS Level Detection

There is a strong negative correlation between the overall sound level for a bearing and the expected lifetime of that bearing. By assessing the sound levels (RMS) and comparing these with some warning levels or threshold levels, a damage to the bearings can be determined. Thus, the RMS level detection provides a particular simple method of determining a fault stage based on signal levels. However, this method has the disadvantage that it is "frequency blind" and can thus not distinguish between different noise sources. Further, the method cannot distinguish between for instance the basis signal and the first harmonic. Thus, it is difficult to provide a robust system and method based on RMS level detection, since the method is not very selective.

Spectral Analysis

Spectral analysis of a vibration signal makes it possible to differentiate between signal components with different frequencies, as they often relates to different sources of vibration. The analysis is often performed using the Power Spectrum of the signal, which calculate how the signal energy is distributed in the frequency domain Based on the bearing geometry, it is possible to calculate four fundamental frequencies, which represent the most common occurrence bearing faults, viz. faults to the outer ring 460, an inner ring 455, a retainer 465 or the balls 440 of the bearings, see also FIG. 9.

The measured frequency will depends on the number of balls of the bearing, the shaft frequency $f_{shaft}$, the ball diameter, the retainer diameter and the ball contact angle. For a given bearing geometry, such as a NSK6305 bearing, faults to the outer ring 460, the inner ring 455, the retainer 465 or the ball 440 may for instance be 3.06, 4.93, 0.38, and 2.03 times the shaft frequency $f_{shaft}$. This means that the faults will be located in different parts of the sound frequency spectrum and may thus be used to identify the type of fault.

Accordingly, the library of the fault detection system may comprise a database of expected spectrums based on bearing types of known pump assembly models.

Envelope Analysis

This is original an analog approach with roots in communication technology. The sound signal can be interpreted as the result of an Amplitude Modulation (AM) of a carrier in accordance with a modulating wave. The modulated wave/baseband signal will be the impact impulse train, and the carrier will be the ringing/characteristic sound of the bearing and corresponding motor construction. In the case of a narrowband AM wave (large carrier frequency compared with the message bandwidth), the demodulation can be accomplished by using a simple, yet highly effective device known as the envelope detector. Ideally, an envelope detector produces an output signal that follows the envelope of the input signal waveform exactly. The analog version consists of a diode and a resistor-capacitor filter to down mixing and lowpass filtering the signal, but a digital version can be obtained using similar operations.

The construction of the envelope detector can also be argued using the Fourier Spectrogram. As this procedure provide some insight into the properties and limitations of the envelope approach, a short presentation will be given next. A property of the wideband Fourier Spectrogram is a high time resolution, as the underlying short-time Fourier transform (STFT) utilize a very short window length. In the case of a periodic signal, the sliding window will alternately pass through high energy and low energy signal areas as a function of time. The corresponding spectra will also be alternately high and low energy spectra, and the corresponding Fourier Spectrogram will be dominated by vertical stripes (the 1/T line spectrum). The wideband Fourier Spectrogram of a vibration signal from a bearing with an outer fault will reveal the envelope curve (impact pulse train) in a certain frequency band.

If the Spectrogram is calculated for a bandpass filtered signal that only contained the frequencies around aforementioned certain frequency band, the envelope curve can be extracted by calculating the time marginal of the spectrogram and may as illustrated in FIG. 10 be carried out without calculation of the spectrogram by bandpass filtering the signal (step 510), absolute square the result (step 520) followed by a low-pass filter (step 530).

The envelope analysis is then obtained when a frequency analysis is performed on the envelope curve from the detector by a Fourier transformation (step 540) and absolute squaring the result (Step 550).

The four fundamental frequencies relating to the four bearing fault types will emerge in the frequency spectrum similar to the spectral analysis.

The envelope analysis approach has the advantage that calculation complexity is simple as it can be done using two filtering operations followed by an FFT. However, the method has the disadvantage in limitation of the selection of the specifications for the bandpass filter. The carrier frequency is not related to the bearing, but depends on the motor construction and placement. It might also change depending on the shaft frequency. This will demand individual setup for each application and may thus be complex.

Cepstral Analysis

A common sign of all bearing faults are the presence of a periodic structure of the measured sound signal. A property of the Narrowband Fourier Spectrogram is a high frequency resolution, as the underlying STFT utilize a long window length. In the case of a periodic signal, the window will catch several periods of the signal, and the corresponding spectrum will be discrete, thus showing a line spectrum.

This means that the Fourier representation of a periodic signal will be a pulse train with equidistant contributions. In the Fourier Spectrogram, this pulse train will show up as horizontal stripes as seen in FIG. 11*a*. A measure of the impact rate will be the distance between any two stripes. But Instead of selecting a pair of frequencies (this would introduce a limitation), an overall estimate of the rate can be obtained by performing a frequency transformation of all the stripes, i.e. a frequency analysis of a frequency representation. This approach is called a Cepstral analysis and the result is illustrated in the Cepstrum shown in FIG. 11*b*. The Cepstrum is generally found by taking the Inverse Fourier Transformation of the logarithm of the estimated spectrum of the measured sound signal.

It is interesting to note, that the Cepstral representation not only illustrate the expected contribution for the aforementioned fundamental frequency 610, but also indicate periodic structures with other impact rates 620, 630, 640. This gives a more descriptive signature of a bearing fault.

Figure 11:
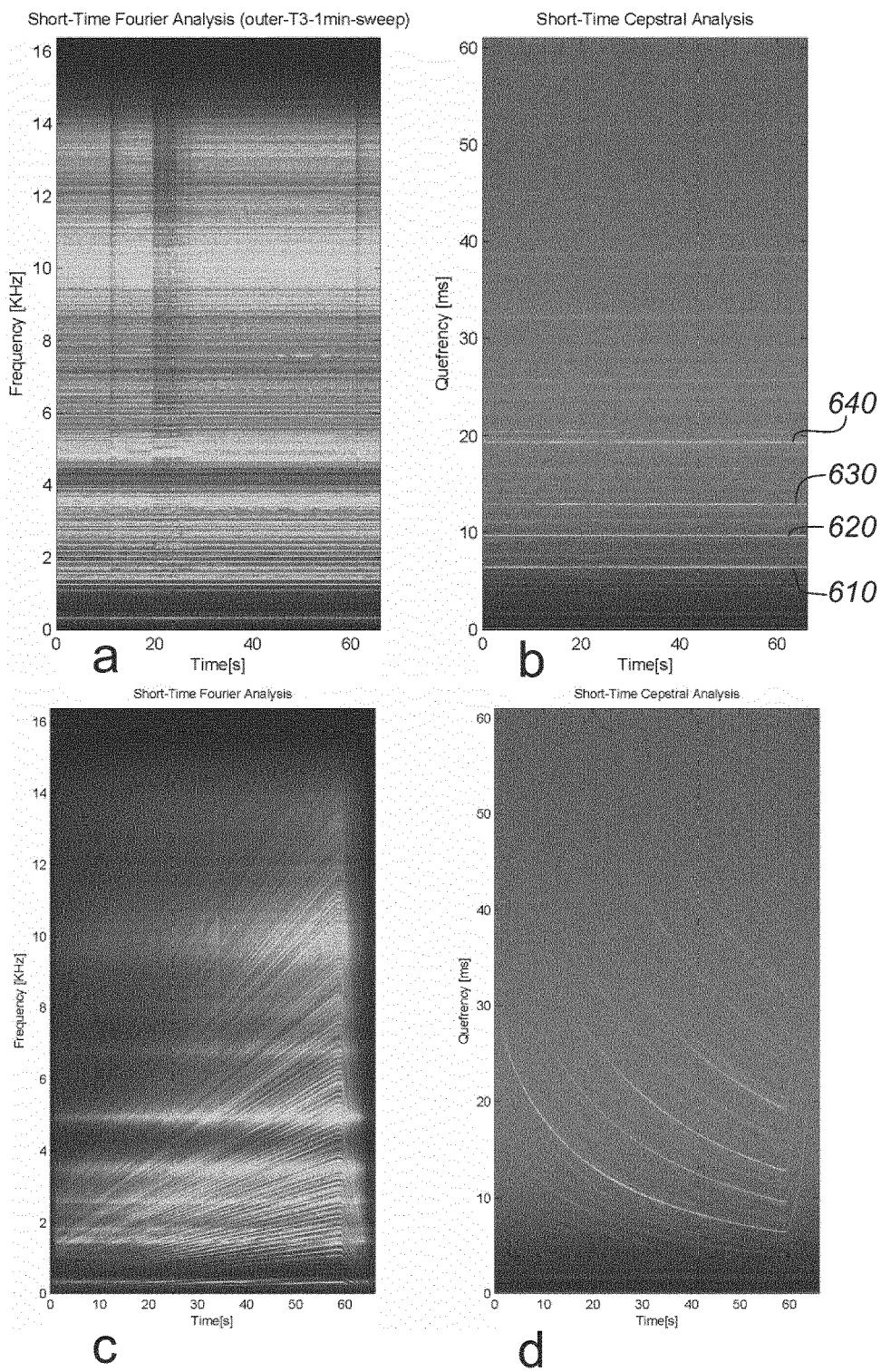
FIG. 11 illustrates diagrams obtained from spectral analyses and Cepstral analyses.

The sound signal used in FIG. 11 has been recorded on a motor with a defect bearing (outer raceway). In FIGS. 11*c* and 11*d*, the shaft speed is swept from 10 Hz to 50 Hz (500 to 2,500 rpm) during 60 seconds. It is very interesting to inspect the corresponding spectrogram in FIG. 11*c*. It illustrate that some part of the spectrum are independent of the shaft frequency, as they are placed as horizontal contributions. They constitute the resonance area of the motor construction. The spectral contributions that increase proportional with the shaft frequency are related to the bearing. For a fixed time position, the frequency slide constitute a discrete spectrum that are related to a periodic signal, and a bearing signal is only periodic when the bearing are defect. To obtain the Cepstral representation in FIG. 11*d*, each column of the spectrogram is high pass filtered and Fourier transformed. The Cepstral representation shows how the impact rate change as a function of time. Often there are more than one impact rates as the vibration signal contain multiple vibration sources. Their position (rate) makes it possible to distinct between different sources.

As the Cepstral representation is based on a frequency analysis of the frequency representation, it measures the frequency content through the complete domain. If some passages of the spectra are attenuated/amplified as result of resonance in the construction, the level of the corresponding Cepstral will only experience a minor change and no peaks will disappear. This property underline the fact, that the Cepstral domain is a measure of periodicity not frequency.

Figure 12:
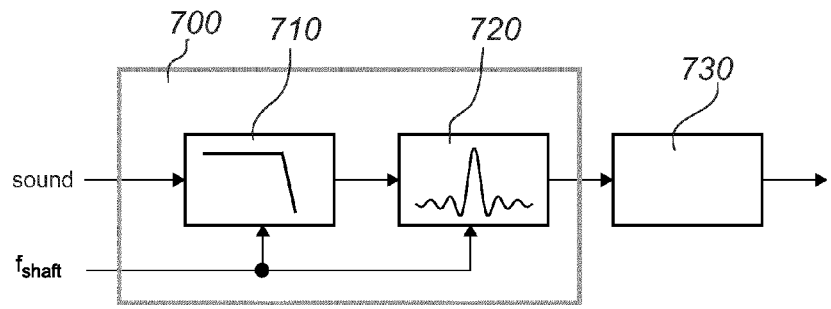
FIG. 12 illustrates a normalisation pre-process for use in Cepstral analysis.

The location of the peaks in the Cepstral domain are depending on the shaft RPM (as illustrated in FIG. 11*d*), and in order to interpreted the Cepstral representation in connection with bearing fault detection, the RPM must be provided in parallel with the Cepstral. This will complicate the task of diagnosing/classification the Cepstral coefficients unnecessary. The location of peaks in a feature for a particular bearing fault must be fixed for variable RPM. This scaling of the Cepstral domain relative to the RPM can in general be obtained in three ways: preprocessing of the vibration data before the Cepstral analysis, scaling one of the frequency axis in the Cepstral calculation or post processing of the Cepstral data. In a preferred embodiment, it has been selected to preprocess the vibration data by resampling in accordance with the detected rotational speed of the shaft, see also previous explanation. The elements of the normalization algorithm is illustrated in FIG. 12.

The measured sound signal is run through a pre-processing step 700, where the measured signal is normalized in relation to the shaft frequency $f_{shaft}$.

The purpose of the preprocessing is to scale the frequency axis of the sound signal. In order to avoid aliasing, the signal must be properly lowpass filtered (in step 710), before down-sampling. This filtering may be performed by a 20th order Butterworth filter. The classical approach to resampling is to filtering the time discrete signal using an non-causal sinc function as impulse response function (step 720), after which the pre-processed signal may be sent through the Cepstral analysis (in step 730).

The RPM can in the case of a synchronous motor be obtained from the frequency converter, but in the case of an asynchronous motor, the RPM has to be measured separately or determined in accordance with the previously explained algorithm from the sound signal.

Once the signal has been normalized and run through the Cepstral analysis, the resulting Cepstrum may be compared to Cepstrums of known operating conditions including fault conditions in order to identify a particular fault. This may for instance be carried out by pattern recognition.

The fault detection system has now been described for four different analysis methods. However, it is recognized that the fault detection may also use a combination of the various analysis methods and that particular fault types may better be detected with one of said methods.

The analysis methods have been described for bearing faults, which typically show themselves at relative low sound frequencies. However, other types of faults may be identified in other frequency bands. Cavitation may for instance be detected via sounds in the kHz band, e.g. between 10 kHz and 20 kHz.

Method for Detecting Faults

Figure 13:
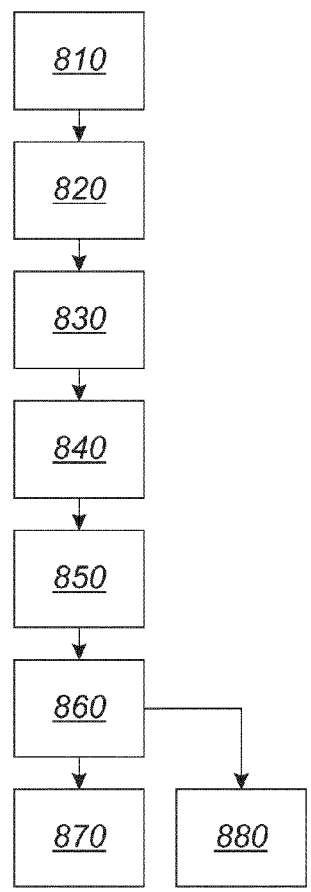
FIG. 13 illustrates the steps in a method of detecting a fault in a pump assembly.

The method for detecting faults in a pump assembly may for instance be carried out in accordance with the steps illustrated in FIG. 13.

In a first step 810, the pump assembly model is input into a software app on the handheld communication device. The pump assembly is optionally run through a pre-routine 820, where the rotational speed of the shaft is increased or set to a speed, where sounds emanating from the pump assembly may be detected via the microphone of the handheld communication device.

In a third step 830, sounds emanating from the pump assembly are contactless measured via the microphone of the handheld communication device. Between step 820 and 830, the software app may for instance provide the user with a guide on the display showing at which positions the microphone and/or the handheld communication device should be arranged so as to obtain the sound measurements. This step may for instance be carried out by simultaneously carrying out a sweep of the rotational speed of the shaft, such that sound measurements are carried out for an interval of shaft speeds.

Positioning of the handheld device, and measurement with the device, is done in two distinct steps. The step of positioning may take between 10 seconds and 1 minute, and measurement may take from 5 seconds to 1 minute depending on the number of parameters to be measured. The distance from the device to the pump assembly is from around 1 meter to a few centimetres, typically in the range from 5 cm to 30 cm from the pump assembly.

When positioning the handheld communication device or microphone, the app will advantageously show in the app on the screen of the device if the signal(s) received from the pump aggregate is adequate and sufficient in amplitude and quality in order to perform a measurement. The user will move the device closer to the pump assembly, or away from the pump assembly, or move the device to the sides, above, or below the pump assembly. While doing this, the device and the app will detect the signal, and once an optimum position is reached, the device may give an acoustic signal, vibrate or give a visual indication in the display of the device. In this way, the handheld communication device has given signal feedback to the user. This signal and device positioning procedure can be made for one single parameter, e.g. for measuring cavitation, or it can be made for several parameters at the same time. In the latter case, the app of the device may find an optimum position for measuring a plurality of parameters at the same time. As the frequency ranges of some of the fault parameters differ from each other, the handheld communication device measures for a first duration of time, e.g. the flow noise in the area of 1 Hz to 25 kHz, and then switches or a second duration of time to e.g. measuring noise generated by the electronics in the range 50 kHz to 200 kHz. Thus, the handheld device, or more precisely the app of the handheld communication device sequentially executes scans of one or more of the noise sources 120 shown in FIG. 4. The order can be set by the app or be random.

The method can also detect dry running of the pump, i.e. the case where the rotor and impeller rotates, but where no liquid is in the pipe. This situation is detrimental to the bearings. By looking at the difference in the sound signal measured when the pump is running with liquid, and when running without liquid, a statement as to "Dry run: Yes" or "Dry run: No" can be made and shown on the display of the handheld device as shown in FIG. 5. The system may also as later explained learn to recognise a dry run state, e.g. via a neural network or a database linking a dry run state with associated sound signal patterns or spectrums and possibly the pump type or model.

The method can likewise also detect unbalance in the pump assembly. The unbalance may for instance be caused from the rotor or the impeller blades. The unbalance may also occur, if the impeller blades are damaged, e.g. from erosion or cavitation. The system may also as later explained learn to recognise a unbalance state, e.g. via a neural network or a database linking a unbalance state with associated sound signal patterns or spectrums and possibly the pump type or model.

In a fourth step 840, the measured sound signals are processed according to the previous routine, i.e. run through an algorithm to estimate the rotational speed of the shaft and further analysed in accordance with one or more of the previously described analysis methods. The analysis may be carried out on the handheld communication device, on an external server or a combination thereof.

In a fifth step 850, the processed signals are compared to stored sound emanating conditions in order to identify the operational condition of the pump assembly and to identify any possible faults. The results of the analysis are displayed on the GUI to the service worker in a sixth step 860.

Based on the possible identified fault, the pump may be instructed in step 870 to not drive the pump assembly in rotational speed regions, where the pump assembly is faulty. This may prolong the time before parts need to be replaced and the lifetime of the pump assembly. The pump assembly may be instructed directly via the handheld communication device or via the external server.

Alternatively, the software app may instruct the service worker to replace the pump assembly or a part of the pump assembly in step 880. The software app may provide a guide on the GUI, which instructs the service worker on how to replace the identified damaged part.

The sound signals measured in step 830 and/or the processed signals 840 may be uploaded to an external server and stored in a library or server. Thereby, it is possible to provide a library of known sound measurements or processed spectrums, whereby the system may better learn to identify different types of faults and optionally dependent on the particular pump assembly type or model. The learning process can for instance be carried out via the use of a neural network. The sound measurements may for instance be linked to a certain types of identified faults, which may also encompass fault types, which have not previously been encountered. This can also facilitate the learning process. Thereby, the fault detection system will continuously be better at identifying fault conditions.

The invention has been described with reference to advantageous embodiments. However, the scope of the invention is not limited to the illustrated embodiments, and alterations and modifications can be carried out without deviating from the scope of the invention, which is defined by the following claims.

REFERENCE NUMERALS

| | |
|---|---|
| 10, 110 | Fault detection system |
| 15, 16 | Pipes |
| 20, 20', 110 | Pump assembly |
| 21 | Common housing |
| 22' | Pump housing |
| 123 | Motor and rotor |
| 24' | Electrical motor housing |
| 124 | Water hammer |

-continued

| | |
|---|---|
| 25' | Terminal box |
| 125 | Impeller |
| 126 | Bearings |
| 127 | Water in pipe noise |
| 128 | Cavitation |
| 129 | Electronic |
| 30, 130 | Handheld communication device/smart phone |
| 131 | Signal processor/micro computer |
| 32, 132 | Microphone |
| 133 | Display |
| 134 | Input module |
| 135 | Communication module |
| 136 | Library |
| 137 | Additional sensor(s)/Accelerometer |
| 40 | Server/cloud |
| 210-290 | Steps in algorithm for detecting shaft speed |
| 310-340 | Parts of condition monitoring system |
| 426 | Bearing |
| 440 | Ball of bearing |
| 450 | Crack/fault |
| 455 | Inner raceway |
| 460 | Outer raceway |
| 465 | Retainer |
| 470 | Sound signal |
| 480 | Periodic structure |
| 510-550 | Steps in envelope analysis |
| 610-640 | Lines referring to fundamental frequency and other impact rates |
| 700-730 | Steps in normalisation and Cepstral analysis |
| 810-880 | Steps in fault detection method according to the invention |

The invention claimed is:

1. A method for detecting faults or operational parameters in a pump assembly including an electric motor and a pump by use of a handheld communication device running an app, wherein the pump assembly or electric motor has at least one rotating shaft, the method comprising:
   a) contactless measuring a sound signal emanating from the pump assembly by use of a microphone connected to or implemented in the handheld communication device,
   b) processing the measured sound signal, and
   c) recognizing one or more sound emanating conditions including any possible faults by way of the processed sound signal,
   wherein the handheld communication device provides a feedback, e.g. an audial, visual or vibrational feedback, when an acceptable measurement position of the microphone has been found.

2. A method according to claim 1, wherein the processing step of step b) comprises the sub-steps of processing the measured sound signal so as to estimate the rotational speed of the rotating shaft and optionally normalizing the measured sound signals or processed sound signals.

3. A method according to claim 1, wherein the processing step of step b) comprises the step of filtering out periodic signals of the processed signal, and wherein the recognition of step c) is carried out by use of the periodic signals.

4. A method according to claim 1, wherein the method comprises the step of running a pre-routine, where the rotating shaft is brought to a drive condition, where sound signals emanating from the pump assembly are detectable by the microphone.

5. A method according to claim 1, wherein steps b) and/or c) are carried out via a processing unit, such as a DSP, implemented in the handheld communication device and/or a software app installed on the handheld communication device.

6. A method according to claim 1, wherein steps b) and/or c) are carried out via a processing unit implemented in an external server or a software program installed on an external server.

7. A method according to claim 1, wherein steps b) and/or c) are carried out via a processing unit and/or software, the processing unit or software comprises a library of different pump assembly types or models.

8. A method according to claim 7, wherein the sound emanating condition including any possible faults in step c) is recognized by use of said library of different pump assembly types or models.

9. A method according to claim 7, wherein a pump assembly type or model is input into the handheld communication device.

10. A method according to claim 9, wherein the app on the handheld communication device prompts an external server for information about the inputted pump assembly type or model.

11. A method according to claim 7, wherein the library further comprises information about how to rectify an identified fault for a particular pump assembly type or model.

12. A method according to claim 7, wherein the library further comprises information about how to align the microphone in relation to the pump assembly.

13. A method according to claim 7, wherein the library further is adapted to accumulate sound measurements or processed sound measurements from different pump assemblies.

14. A method according to claim 1, wherein step a) comprises a plurality of measurements with the microphone arranged at different locations relative to the pump assembly.

15. A method according to claim 1, wherein the processing in step b) is carried out via a method chosen from the group of:
   RMS level detection;
   spectral analysis;
   envelope analysis; or
   Cepstral analysis.

16. A method according to claim 1, wherein the at least one rotating shaft is swept from a first rotational speed to a second rotational speed over a pre-set time period, and wherein a spectrogram is generated and processed.

17. A method according to claim 16, wherein fault states are logged during the sweep in order to identify rotational speed regions, where the pump assembly is faulty.

18. A method according to claim 17, wherein the pump assembly is subsequently instructed to avoid driving the pump assembly at rotational speed regions, where the pump assembly is faulty.

19. A method according to claim 1, wherein the measurements are carried out at a plurality of different discrete rotational speeds of the at least one rotating shaft, e.g. to find optimum measurement conditions.

20. A method according to claim 19, wherein the estimation of the rotational speed is carried out via a spectral analysis.

21. A method according to claim 1, wherein fault states are identified among the group of: bearing faults, cavitation, dry running, water hammering and unbalance.

22. A fault detection system for detecting faults or operational parameters in a pump assembly comprising a pump and an electric motor, wherein the pump assembly or electric motor has at least one rotating shaft, the fault detection system comprising:

a handheld communication device, which includes a microphone for contactless measuring sound emanating from the pump assembly or electric motor;

a processing unit implemented in the handheld communication device and a software app installed on the handheld communication device for processing a measured sound signal measured via said microphone;

a recognition module for recognizing a sound emanating condition including any possible faults by way of the processed sound signal, wherein the fault detection system is configured to provide feedback when an acceptable measurement position of the microphone has been found.

23. A fault detection system according to claim 22, wherein the microphone is implemented in the handheld communication device.

24. A fault detection system according to claim 22, wherein the microphone is externally coupled to the handheld communication device.

25. A fault detection system according to claim 22, wherein the recognition module is implemented on the handheld communication device.

26. A fault detection system according to claim 22, further comprising an external server.

27. A fault detection system according to claim 26, wherein the recognition module is implemented on the external server.

28. A fault detection system according to claim 22, wherein the system further comprises a filter module adapted for processing the detected sound signal so as to eliminate an influence of a current rotational speed of the shaft and filtering out periodic signals of the processed signal.

29. A fault detection system according to claim 22, wherein the processing unit and/or filter module comprises an analysis module chosen from the group of:
an RMS level detection module;
a spectral analysis module;
an envelope analysis module; or
a Cepstral analysis module.

30. A fault detection system according to claim 22, wherein the recognition module comprises a fuzzy logic and/or a neural network.

31. A fault detection system according to claim 22, wherein the system comprises a library module, in which characteristic patterns are stored for certain operating conditions, and wherein the recognizing module is designed for recognition of an operating condition by way of the stored pattern.

32. A fault detection system according to claim 22, wherein the recognition module is adapted to estimate the rotational speed of the at least one rotating shaft.

* * * * *